Patented Aug. 21, 1923.

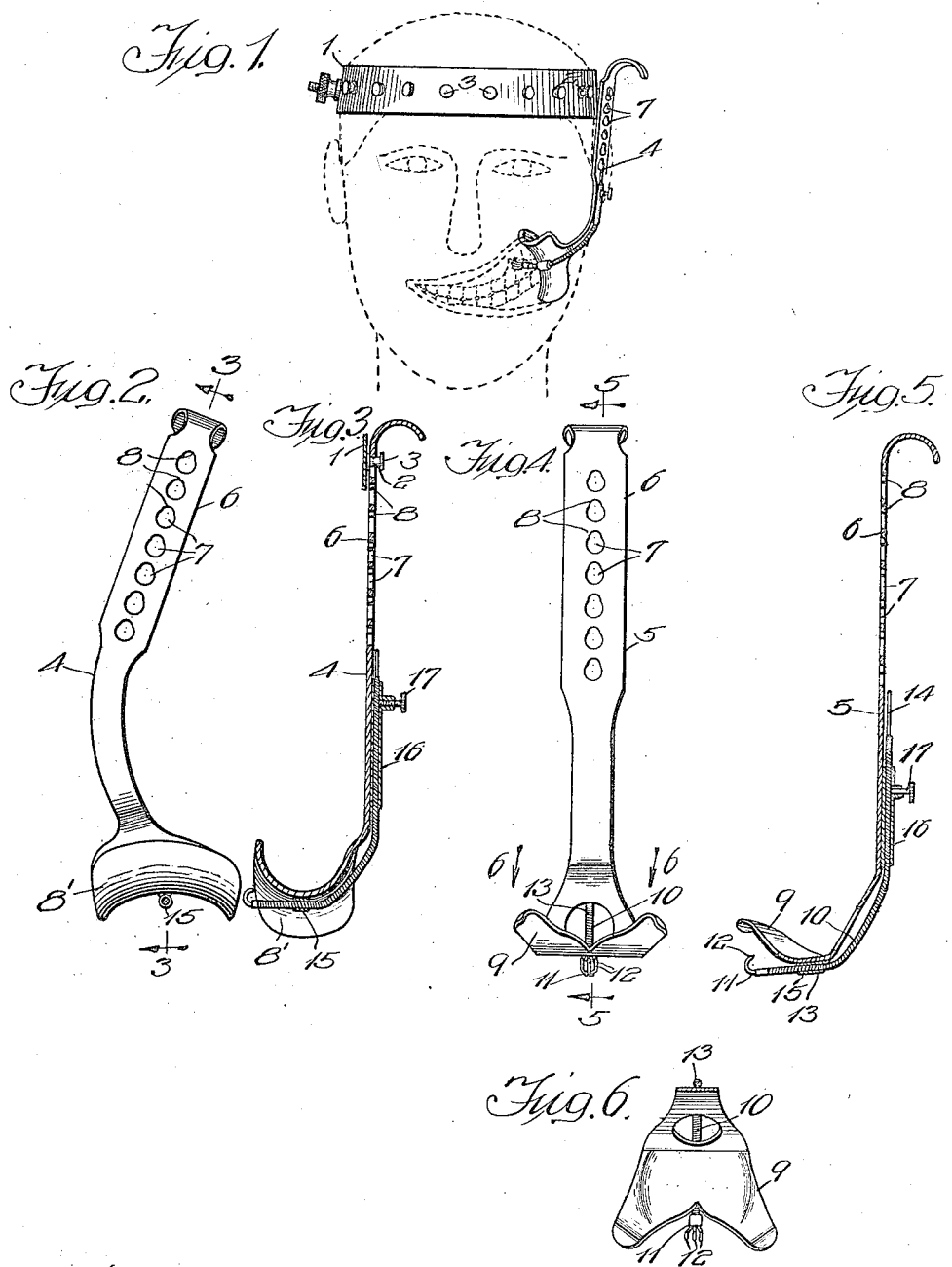

1,465,259

UNITED STATES PATENT OFFICE.

HENRY FRIEDMAN, OF CHICAGO, ILLINOIS.

DENTAL APPARATUS.

Application filed October 10, 1921. Serial No. 506,735.

*To all whom it may concern:*

Be it known that I, HENRY FRIEDMAN, a citizen of the United States, and resident of Chicago, in the county of Cook and State of Illinois, have invented certain new and useful Improvements in a Dental Apparatus, of which the following is a specification.

My invention relates to improvements in a dental apparatus and has particular reference to an improved device for assisting in performing operations upon the teeth where it is desirable or necessary to uncover the root portions of the teeth.

The object of my invention is to provide a device which will not only hold the lips retracted to uncover the portion of the jaw containing the tooth to be operated upon, but which shall also be capable of engaging and retracting the gum to expose the root portion of the tooth.

My invention resides in a suitable lip retractor adapted to be held in position upon the head of the patient in combination with a gum retractor carried by the lip retractor and formed for engaging the gum where cut and capable of being adjusted to retract the gum and expose the tooth to be operated upon.

A further feature of my invention relates to a peculiar yielding gum retractor which I provide and which is adapted to be readily adjusted back and forth while arranged in guides extending substantially at a right angle to each other.

My invention will be more readily understood by reference to the accompanying drawings forming a part of this specification and in which:—

Figure 1 is a front view of a device embodying my invention and shown in operative position on the head of a patient;

Figure 2 is a rear elevational view of a side lip retractor such as is shown in Figure 1;

Figure 3 is a vertical section on the line 3—3 of Figure 2;

Figure 4 is a view similar to Figure 2 but showing an upper lip retractor;

Figure 5 is a sectional view similar to Figure 3 taken on the line 5—5 of Figure 4; and Figure 6 is a horizontal sectional view on the line 6—6 of Figure 4.

In said drawings 1 illustrates an adjustable head band preferably formed of metal and provided with a plurality of outwardly extending projections 2, having enlarged heads 3. These projections are provided for receiving and holding suitably formed lip retractors of which I have illustrated a side lip form 4 and an upper lip form 5. Each form of lip retractor has an upper handle or stem portion 6 provided with a plurality of openings 7 for receiving the projections 2 and having upper contracted portions 8 smaller than the heads 3, so that when the lip retractors are engaged with the head band they will be held in position. The several openings 7 in the handle portion of each retractor are for the purpose of adjusting the lip retractors vertically to properly retract the lips of the patient. The lower end of the side lip retractor 4 is provided with a lip engaging end 8' adapted to hook within the mouth of the patient and when the retractor is elevated and secured to the head, as described, to hold the side lip drawn back and the lips spread apart, as shown in Figure 1. It will be understood that a complete set of devices includes both right and left-hand side lip retractors of which I have only shown the left-hand one. The upper lip retractor 5 is likewise provided at its lower end with a lip engaging flange or member 9 adapted to be entered into the mouth below the upper lip and lift the same in an obvious manner. The operation in connection with which my device is particularly useful is that operation in which it is necessary to scrape, clean or cut the root portion of a tooth and for this purpose it is desirable to expose the root of the tooth by holding back the gum usually by making a suitable incision through the gum and then drawing back one or both walls of the incision to properly expose the tooth.

For the purpose of engaging and drawing back the wall of the incision I provide a gum retractor 10 comprising a hooked end 11, shown in the drawings as composed of three small rearwardly bent hooks 12, having their free ends quite sharp. These three hooks are in the form of bent fingers and are adapted to be engaged in the side wall of an incision in the gum and the retractor 10 is adapted to be drawn back to withdraw the gum and expose the tooth. The hooked end 11 is mounted upon a yielding spring 13 which is long enough to extend around the lower end of the lip retractor and its opposite end is secured upon a rod 14, by means of which the rear end of the retractor is made rigid. For guiding the gum retractor and holding it in position upon the lip retractor I provide a short tubular guide 15 at the lower end of the lip retractor and which extends substantially horizontally when the device is in use. I provide upon the lip retractor, above its lower end, a second tubular guide 16 for receiving the rear rigid end of the gum retractor. I make this rear end rigid for the purpose of being able to clamp it in position by means of a suitable clamping screw 17, carried by the guide 16 and adapted to clamp the rigid end of the gum retractor in the guide 16 in an obvious manner.

In the use of such instruments it is desirable that they be capable of being thoroughly sterilized after each operation and for this purpose it is desirable that the gum retractor be readily removable from the lip retractor. The yielding forward end of the gum retractor permits its ready removal from the two guides in an obvious manner, as indicated in dotted lines in Figure 5, even though the two guides are arranged at right angles to each other. In applying this instrument to a patient the lip retractor is first adjusted and secured to the head band with the lip properly retracted, then the hooked end of the gum retractor is pulled forward, after the incision has been made in the gum if such is necessary and suitably engaged in one wall of the incision. Thereafter the rigid end of the gum retractor is drawn upwardly and the wall of the incision is drawn back with a yielding strain and when sufficiently retracted the gum retractor is secured in its adjusted position by means of the clamping screw 17.

As many modifications of my invention will readily suggest themselves to one skilled in the art I do not limit or confine my invention to the specific details of construction herein shown and described.

I claim:

1. In a device of the kind described, a lip retractor, means for holding the retractor in position on the head of a patient, and means carried by the retractor for engaging and retracting a gum at an incision.

2. In a device of the kind described, a lip retractor, means for attaching the retractor upon the head of a patient, and a hook device carried by the retractor for engaging and retracting the gum.

3. In a device of the kind described, a lip retractor, means for mounting the retractor upon the head of a patient, and an adjustable gum engaging device carried by the lip retractor for retracting the gum.

4. A lip retractor, means for mounting the retractor upon the head of a patient, and a yielding adjustable device carried by the lip retractor and provided with a hooked end for engaging the gum for retracting same.

5. A lip retractor, means for mounting the retractor upon the head of a patient, and a gum retractor carried by the lip retractor, the gum retractor comprising a hook device for engaging the gum at an incision, the hooked device carried on one end of a laterally adjustable member, the opposite end of said member secured to a rigid member, and a clamping screw for securing the rigid member to the lip retractor in an adjusted position.

6. The combination with a lip retractor, of a gum retractor, the lip retractor provided with tubular guides, the gum retractor adapted to be mounted in said guides, and means for retaining the gum retractor in an adjusted position.

7. A lip retractor, tubular guides thereon, an adjustable gum retractor mounted in said guides and provided with a hooked end for engagement with the gum, and means carried by the lip retractor for retaining the gum retractor in an adjusted position.

8. A lip retractor in combination with a gum retractor, tubular guides arranged at substantially a right angle to each other on the lip retractor, the gum retractor having a yielding portion permitting the insertion and removal of the gun retractor, and means for retaining the gum retractor in an adjusted position.

9. A spring extensible gum retractor having a hooked end for engagement with a gum, and means for holding the gum retractor in extended adjusted position when in engagement with the gum.

Signed at Chicago, Illinois, this 8th day of September, 1921.

HENRY FRIEDMAN.